Jan. 1, 1952  J. H. MILLER  2,580,452
AUTOMATIC CONTROL SYSTEM FOR AIRCRAFT RETRACTABLE LANDING GEAR
Filed Sept. 10, 1948

Inventor
JAMES H. MILLER

By F. J. Schmitt
Attorney

UNITED STATES PATENT OFFICE 2,580,452

AUTOMATIC CONTROL SYSTEM FOR AIRCRAFT RETRACTABLE LANDING GEAR

James H. Miller, Norfolk, Va.

Application September 10, 1948, Serial No. 48,546

8 Claims. (Cl. 244—102)

(Granted under the act of March 3, 1883, as amended April 30, 1928; 370 O. G. 757)

The present invention relates to an automatic control system for aircraft retractable landing gear and more particularly to an automatic control system for raising after take-off, and lowering prior to landing, aircraft retractable landing gear.

It is generally well known that a large percentage of aircraft crashes are caused by human error. This is particularly true of crashes resulting from landings wherein the wheels remain in retracted position. The present invention is concerned chiefly with the elimination of the function of the pilot in the lowering of the landing gear preparatory to landing and the concomitant elimination of one form of human error in aircraft travel.

Briefly, this invention comprises an automatic device mounted in the aircraft and arranged to control the actuating source for raising and lowering the aircraft landing gear. The device comprises motive means, means operable by said motive means for controlling the actuating source, relay means for actuating said motive means, and switch means responsive to the speed and the inclination of the aircraft for controlling the operation of said relay means.

In operation, with the craft flying at a given altitude, at a safe flying speed and with the landing gear in retracted position, the pilot proceeds to prepare for landing by reducing the power and setting the craft in its angle of descent. As soon as the angle of descent reaches a predetermined degree and the air speed decreases to a predetermined value, the switch means operates the motive means which causes the landing gear to be lowered. Upon the take-off of the craft, the air speed and the angle of climb actuate the motive means in a reverse direction causing the landing gear to rise.

An object of the present invention is to provide an automatic control system for aircraft retractable landing gear which is responsive to the flight conditions of the craft.

Another object is the provision of an aircraft automatic control system responsive to the inclination and the air speed of the craft.

A further object of the invention is the provision of automatic control means for an aircraft for lowering the landing gear of the craft prior to landing and for raising the gear after take-off.

A still further object is to provide automatic control means for an aircraft for lowering the landing gear of the craft when the air speed reaches a predetermined minimum value and the inclination of the craft attains a predetermined angle of negative pitch.

A final object of the present invention is the provision of automatic control means for raising the landing gear of an aircraft when the air speed attains a predetermined maximum value and the inclination of the craft reaches a predetermined degree in another direction.

Other objects of the invention will hereinafter become more fully apparent from the following description of the annexed drawings, which illustrate a preferred embodiment, and wherein.

Figure 1:
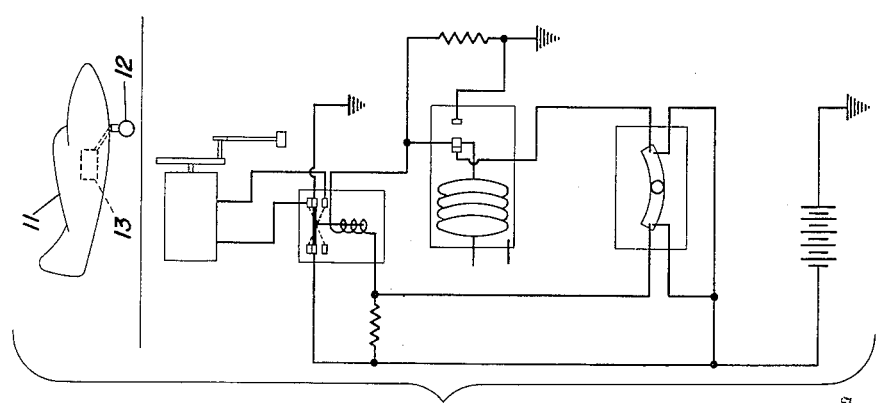
Fig. 1 illustrates a side elevation of an aircraft showing the system of the present invention mounted thereon.

Referring now to the drawings, wherein like reference characters designate like or corresponding parts throughout the several views, there is shown in Fig. 1 an aircraft 11 having landing gear 12 and the automatic control system 13 mounted thereon. The system 13 may be directly connected to the landing gear 12, or, preferably, may be connected to the actuating source (not shown) for the landing gear and positioned so as to control the operation of the source, and thereby the operation of the landing gear.

Figure 2:
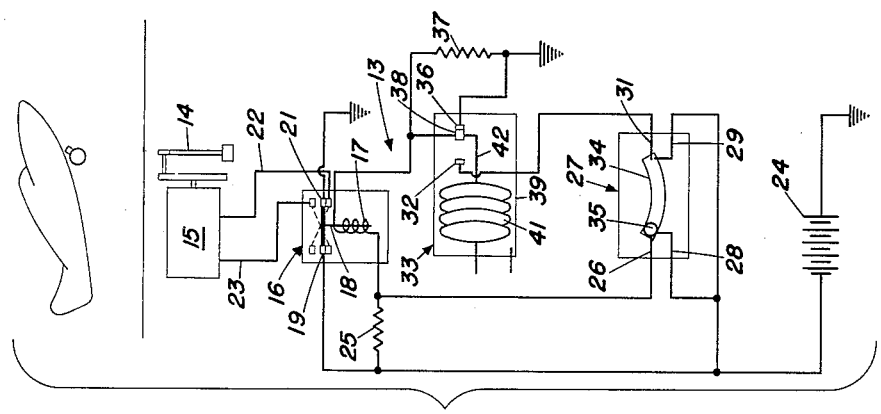
Fig. 2 is a schematic diagram of the system of Fig. 1 illustrating the position of the various elements of the system when the aircraft is climbing after take-off and the landing gear is in the process of retracting.

The system 13, as shown in Fig. 2, comprises a landing gear position selector 14 connected to the actuating source (not shown) and operable by an electric motor 15, preferably of the reversible type. The motor is preferably provided with limit stops in its extreme forward and reverse positions wherein the landing gear is either fully retracted or extended.

Figure 3:
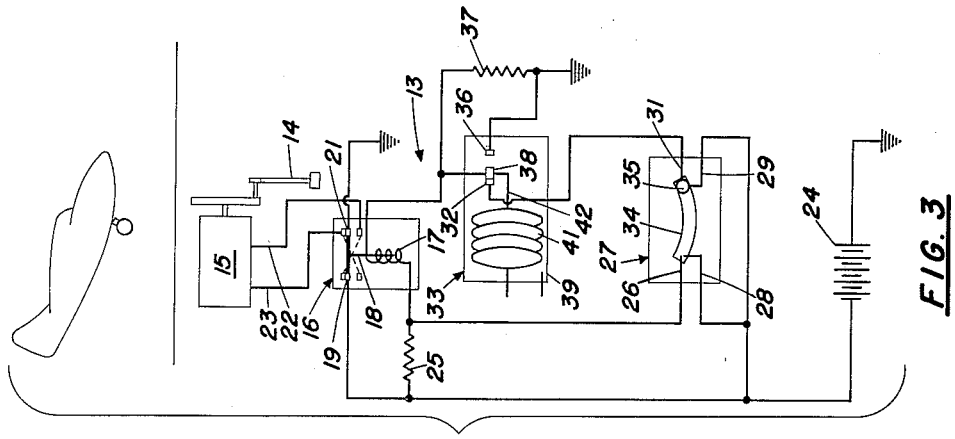
Fig. 3 is a view similar to Fig. 2 showing the elements in landing position.

Motor 15 is controlled by an electromagnetic relay 16 having a coil 17 and an armature 18, the armature 18 carrying a pair of contacts 19 and 21, one of which, 21 is grounded. Relay 16 has four fixed contacts, interconnected in pairs, one of each pair being connected to motor 15 by means of leads 22 and 23, respectively, thereby forming a reversing switch for motor 15. Armature 18 is normally biased to the upper position, as shown in Fig. 3, whereby electrical connection is made to the motor in such manner as to maintain the landing gear 12 in extended position. It is to be understood that the specific switch connections are merely shown as illustrative and that any other reversing type connection may be used.

Coil 17 or relay 16 has one of its ends connected to one end of a power supply, such as a battery 24, through limiting resistor 25, and to one contact 26 of an inclinometer switch 27. Battery 24 has its other end grounded and has its one end connected to two other contacts 28, 29 of switch 27, the fourth contact 31 of switch 27 being connected to one of the fixed contacts 32 of air speed switch 33.

Inclinometer switch 27 preferably consists of a glass tube 34 with a small amount of mercury 35 contained therein, the mercury electrically connecting the adjacent contacts when it is in either of its extreme positions. The travel of mercury 35 within tube 34 is governed by the off-level position of the tube having its ends angularly spaced preferably approximately five degrees from the thrust line of the aircraft. Thus, it is apparent that as the nose of the aircraft 11 rises, the mercury 35 travels to the rear of the tube 34 thereby electrically connecting contacts 26 and 28, and that with the nose down more than five degrees the mercury travels to the front of the tube thereby electrically connecting contacts 29 and 31.

Air speed switch 33 has a second fixed contact 36 connected to ground and also connected to the other end of coil 17 through a limiting resistor 37, while the movable contact 38 of switch 33 is connected to the other end of coil 17. Air speed switch 33 further comprises an air tight case 39 vented to the air speed Venturi tube (static), not shown, the case 39 containing a sensitive bellows 41 joined to the air speed Pitot tube (pressure), not shown, and to a main shaft 42 to which the movable contact 38 is connected. All of the contacts of switch 33 are within case 39, movement of contact 38 being controlled by the expansion and contraction of bellows 41. Contacts 32 and 36 are adjustable, one being preferably set in a position which corresponds to a safe margin above stalling speed while the other is preferably fixed to correspond with a safe margin above flying speed.

In operation, the position of the elements shortly after take-off as the craft 11 is climbing is shown in Fig. 2. The nose of craft 11 has risen sufficiently to cause mercury 35 to move to the rear of tube 34 thereby connecting contacts 26 and 28, while the speed of craft 11 has exceeded the flying speed so that diaphragm 41 has expanded sufficiently to move shaft 42 so that contact 38 is connected to contact 36. In this position a circuit is completed from battery 24, contacts 26 and 28, coil 17, contacts 36 and 38, to ground, thereby energizing coil 17 and drawing armature 18 downward to complete the circuit to motor 15 which drives selector 14 to the retracted position.

As craft 11 levels off the mercury 35 moves back toward the center of glass 34 disconnecting contacts 26 and 28, but the current passing through coil 17 from battery 24 and through resistor 25, although insufficient to energize the relay 16, is sufficient to maintain it energized. If the craft were to nose downward during flight and mercury 35 connected contacts 29 and 31, the landing gear would remain retracted so long as the air speed of the craft was above the minimum speed. If the speed of the craft fell below the speed necessary to maintain contacts 36 and 38 connected, the circuit would remain completed through resistor 37, and the current through the coil would still be sufficient to maintain the relay energized.

As the craft approaches for a landing it noses downwardly so that mercury 35 connects contacts 29 and 31 while the speed is decreased sufficiently so that bellows 41 contracts connecting contacts 32 and 38. In this position (see Fig. 3), coil 17 is shorted out of the circuit and the relay 16 is deenergized, armature 18 returning to its normal position so that motor 15 is energized in the opposite direction thereby driving selector 14 to the extended position, as shown. If desired, a switch may be added so as to break the circuit of the system after the landing of the craft.

Various modifications are contemplated and may obviously be resorted to by those skilled in the art without departing from the spirit and scope of the invention, as hereinafter defined by the appended claims, as only a preferred embodiment thereof has been disclosed.

The invention described herein may be manufactured and used by or for the Government of the United States of America for governmental purposes without the payment of any royalties thereon or therefor.

What is claimed is:

1. In an aircraft having retractable landing gear and an actuating source for controlling said gear, an automatic control system comprising motive means, means operable by said motive means for controlling the operation of said source, relay means for actuating said motive means, and switch means responsive to the speed and the inclination of the aircraft for controlling the energization of said relay means.

2. In an aircraft having retractable landing gear, an automatic control system comprising motive means, selector means operable by said motive means for controlling the position of said gear, a source of energy for said motive means, relay means connected between said source and said motive means for controlling the operation of said motive means, and switch means responsive to the speed and the inclination of the aircraft for controlling the energization of said relay means.

3. In an aircraft, in combination, retractable landing gear, motive means for controlling the position of said landing gear, a source of energy for said motive means, relay means for controlling the energy supplied by said source to said motive means, and switch means responsive to the speed and the inclination of the aircraft for controlling the energization of said relay means.

4. The combination according to claim 3, wherein said switch means comprises an inclinometer switch responsive to the inclination of said aircraft and an air speed switch responsive to the speed of said aircraft.

5. In an aircraft having retractable landing gear, an automatic control system comprising motive means for controlling the position of said landing gear, a source of energy, relay means for controlling the energy supplied by said source to said motive means, and switch means for controlling the energization of said relay means, said switch means comprising an inclinometer switch responsive to the inclination of said aircraft and an air speed switch responsive to the speed of said aircraft.

6. In a system for automatically controlling the operation of aircraft retractable landing gear, the combination comprising reversible motive means for controlling the position of said gear, a source of electrical energy, relay means for controlling the direction of energization of said motive means from said source, a first switch responsive to the inclination of the aircraft for controlling the energization of said relay means, and a second switch responsive to the airspeed of the aircraft for controlling the energization of said relay means, said switches being so arranged that actuation of either of them is insufficient to energize said relay means but is sufficient to maintain said relay means energized.

7. In a system for automatically controlling the operation of aircraft retractable landing gear, the combination comprising a source of electrical energy, relay means having a coil energizable from said source for controlling the position of said gear, an inclinometer switch having a plurality of pairs of normally open contacts, one of each of said pairs being connected to one terminal of said source, and an airspeed switch having a movable contact responsive to airspeed and connected to one end of said coil and a pair of fixed contacts connected to the other terminal of said source and to the other of one of said pairs of contacts respectively, the other of another of said pairs of contacts being connected to the other terminal of said coil.

8. The combination according to claim 7, wherein said inclinometer switch has two pairs of normally open contacts arranged so that one of said two pairs of contacts closes when the aircraft is downwardly inclined beyond a predetermined angle and the other of said two pairs of contacts closes when the aircraft is upwardly inclined beyond a predetermined angle.

JAMES H. MILLER.

REFERENCES CITED

The following references are of record in the file of this patent:

UNITED STATES PATENTS

| Number | Name | Date |
| --- | --- | --- |
| 1,142,218 | Wood | June 8, 1915 |
| 2,112,253 | Smith | Mar. 29, 1938 |
| 2,148,471 | Jones | Feb. 28, 1939 |
| 2,176,817 | Jacobson | Oct. 17, 1939 |
| 2,316,682 | Finnegan | Apr. 13, 1943 |